United States Patent [19]

Myles, III et al.

[11] Patent Number: 5,564,411
[45] Date of Patent: Oct. 15, 1996

[54] ROOF MODULE HAVING AN INTEGRAL SOLAR ENERGY CONCENTRATOR

[76] Inventors: John F. Myles, III, Rte. 3, Box 200, Pittsboro, N.C. 27312; Michael H. Nicklas, 1237 Gatehouse Dr., Cary, N.C. 27511; Louis J. Gerics, 804 Sasser St., Raleigh, N.C. 27604

[21] Appl. No.: 879,843

[22] Filed: Jan. 26, 1995

[51] Int. Cl.⁶ .................................................. E04D 13/18
[52] U.S. Cl. ........................... 126/621; 126/684; 126/692; 126/644; 126/696
[58] Field of Search ............................ 126/684, 621, 126/623, 622, 628, 629, 692–695, 696

[56] References Cited

U.S. PATENT DOCUMENTS

| | | | |
|---|---|---|---|
| 2,625,930 | 1/1953 | Havis | 126/621 X |
| 3,868,823 | 3/1975 | Russell, Jr. et al. | 126/600 X |
| 4,149,523 | 4/1979 | Boy-Marcotte et al. | 126/589 |
| 4,291,679 | 9/1981 | Kersavage | 126/621 |
| 4,309,984 | 1/1982 | Dorbeck | 126/599 |
| 4,579,106 | 4/1986 | Townsend et al. | 126/621 X |
| 4,587,951 | 5/1986 | Townsend et al. | 126/621 X |
| 4,602,613 | 7/1986 | Barr | 126/600 |

*Primary Examiner*—Larry Jones
*Attorney, Agent, or Firm*—Brian D. Voyce

[57] ABSTRACT

The present invention relates to a roof module having an integral solar energy concentrator. The present modules can be combined to form a weathertight roof with an integral solar concentrator. Radiant solar energy can be collected from this modular roof using reflected solar energy collectors, among other solar energy concentrating or energy transferring elements. The present invention results in a lower weight and easier to install system for placing solar energy concentrators atop a structure, and thus, lower the cost collecting radiant solar energy from atop a building or roofed structure.

87 Claims, 5 Drawing Sheets

5,564,411

ROOF MODULE HAVING AN INTEGRAL SOLAR ENERGY CONCENTRATOR

TECHNICAL FIELD

The present invention relates to a roof module having an integral solar energy concentrator. The present modules can be combined to form a weathertight roof. Radiant solar energy can be collected from this modular roof using reflected solar energy collectors, among other solar energy concentrating or energy transferring elements. Preferably, the roof module is sized to be preassembled for transport to the site of intended use. The present invention results in a lower weight and easier to install system for incorporating solar energy concentrators atop a structure, and thus, lowers the cost of collecting radiant solar energy from atop a building or roofed structure.

RELATED APPLICATIONS

The present invention is a modular form of certain elements of the integral solar concentrator roof described in an application entitled "A Roof Having an Integral Solar Energy Concentrating System", filed concurrently herewith, and incorporated by reference hereto.

The present invention also can incorporate the use of replaceable solar energy concentrating reflectors as described in an application entitled "An Improved Solar Energy Concentrating System Having Replaceable Reflectors", filed concurrently herewith, and incorporated by reference hereto.

BACKGROUND ART

In the past, if solar energy concentrating systems were used on top of buildings or roofed structures to gather radiant solar energy, then one could select from two options. The first option was simply to take a solar energy concentrating system suitable for use on the ground and mount it up on top of a roofed structure. While such an approach did gather radiant solar energy, it also required that the roof support a substantially greater weight. This add-on approach resulted in substantially higher capital costs. Moreover, once the system was atop the roofed structure, inevitably the underlying roof would need repair. The presence of the system atop the roof in a non-integrated fashion increased the ease and cost of making roof repairs.

The second option was to make a substantial portion of the roof into a solar energy concentrating reflector. An example of this unitary reflector approach can be found in U.S. Pat. No. 3,994,435 to Barr. While Barr no longer had the disadvantage of added supporting structure, Barr had to make compromises in gathering the radiant solar energy. The semi-cylindrical reflector and fixed collector did not collect as much solar energy as ground-based units with better geometries. Also, Barr required that the underlying building have a shape similar to the reflector, and thus, the ends of the Barr building had to swoop arcuately upwards, mimicking the reflector arc. Such a requirement had obvious disadvantages in being used on the numerous flat roofed buildings and roofed structures which are used for commercial or industrial purposes.

SUMMARY OF THE INVENTION

The present invention relates to a roof module having an integral solar energy concentrator. The present modules can be combined to form a weathertight roof. Radiant solar energy striking this modular roof can be collected by adding other solar energy concentrating or energy transferring elements, such as reflected solar energy collectors. Preferably, the roof module is sized to be preassembled for transport to the site of intended use. The present invention results in a lower weight and easier to install system for incorporating solar energy concentrators atop a structure, and thus, lower the cost of collecting radiant solar energy from atop a building or roofed structure.

With the present invention, a roof is made from at least one module, typically from a plurality of modules. A roof module comprises a number of elements, starting with a roof spanning member, having a distal end and a proximal end. (For the purposes of the present invention, "roof spanning member" includes conventional load bearing structures for supporting roofs such as trusses or beams.) The roof spanning member in a module has a width that spans a predetermined distance, typically from 8 feet to 16 feet. The roof spanning member is dimensioned and configured such that either the proximal end, the distal end, or both ends of a first roof spanning member in a first roof module have attachment means that allow the end to be connected to either the proximal end or the distal end of a second roof spanning member in a second roof module. (In some preferred modes, the roof spanning members can be dimensioned and configured such that only distal ends attach to the proximal ends or vice versa.)

The roof spanning member has a plurality of upper panel support points, a plurality of lower panel support points, or a combination of upper panel support points and lower panel support points. (For the purposes of the present invention, an "underlying panel support point means" includes an upper panel support point or a lower panel support point.) These panel support points are for attaching and supporting either a reflector backing panel or a reflector. The lower panel support points are spaced outward from and down from the upper support points. The roof spanning member is dimensioned and configured to support the weight of all of the roof-supported elements in the following paragraphs, as well as conventional roof-mounted dead loads and live loads known to those of ordinary skill in the art.

In either the reflector module format or the reflector backing panel module format, a number of modules can be placed between a first load-bearing building member of a roofed structure to a second upright load-bearing building member of the roofed structure. (For the purposes of the present invention, "upright load-bearing building member" includes conventional means of supporting roof spanning members, such as walls or columns.) For example, if the span between two walls is 90 feet, and the modules are 16 feet in length, then 5 modules can be connected end-to-end, with an auxiliary roof spanning member of 5 feet attached to each of the end modules. Each auxiliary module has attachment means that connect to the attachment means of the end or terminal modules. Roof modules can be combined to span distances of over 100 feet.

Each module is designed to be part of a solar energy concentrating system that uses a reflected solar energy collector. Thus, a roof module will have a mounting means for a collector support means which is disposed above each row of laterally adjacent reflectors in a roof module.

As installed on top of load-bearing members, the roof modules can be butted laterally against another module so that the lower edge of a first reflector backing panel of a first roof module is adjacent to the lower edge of a second reflector backing panel of a second roof module. Alternatively, the roof modules can be separated at the lower edges by a distance sufficient to allow the installation of gutter means, as shown in FIG. 4.

The modules of the present invention have two main variants with respect to the weathertight roofing surface. In the first variant, a reflector backing panel is used as part of this surface. In the second variant, no backing panel is used and the reflector is part of the weathertight roofing surface.

Reflector/Reflector Backing Panel Module

In the first module variant, at least one reflector backing panel is used as part of the roofing surface, but a plurality of reflector backing panels may be used. For example, if the roof spanning member is 16 feet long, then four reflector backing panels may be used, each 4 foot wide. Each reflector backing panel has a concave and cylindrically arcuate configuration of up to 180 degrees, a lower edge, an upper edge, and curved lateral edges. (For the purposes of the present invention, "lower" and "upper" with respect to the reflectors or the reflector backing panels do not express, necessarily, a relative position between the edges. For example, if a reflector has a 180 degree configuration, then these edges may be equidistant in height with respect to its supporting surface.) If a plurality are used on each module, the reflector backing panels are disposed adjacent to one another in a row above and connected to the roof spanning member, for up to the entire length of the roof spanning member. At least one of the curved lateral edges of at least one of the reflector backing panels disposed in the row attaches either to the upper panel support points of the underlying roof spanning member, to the lower panel support points of the underlying roof spanning member, or to a combination of such upper panel support points and lower panel support points. Each reflector backing panel is disposed such that the skyward surface is the concave surface. Also, each reflector backing panel is dimensioned and configured along the curved lateral edges wherein the curved lateral edge of a reflector backing panel can be placed adjacent along the curved lateral edge of another reflector backing panel for the length of the underlying roof spanning member so as to form the row of adjacent reflector backing panels. One of ordinary skill in the art can use various materials to construct a reflector backing panel that has dimensional and configurational stability, including fabricated metals or alloys, and molded laminates or composites. The width and height of each module is determined by the arc length of the reflector backing panel. The greater the arc length, the taller and wider the module. Typically, one would desire modules that are from 4 feet to 16 feet wide and from 8 feet to 48 feet long, for movement over roads by trucks.

On top of the reflector backing panel lies a reflector. Thus, the present invention also comprises at least one reflector, but, typically, a plurality of solar energy concentrating reflectors. Each reflector has a concave and cylindrically arcuate configuration complementary to an underlying reflector backing panel. As in conventional solar energy concentrating systems, each reflector has a skyward facing surface that reflects radiant solar energy. Each reflector has an upper edge, a lower edge, and curved lateral edges. Finally, each reflector is disposed on top of the skyward surface of an underlying reflector backing panel. The reflector is attached to the reflector backing panel either by conventional mechanical fastening means or conventional chemical fastening means such as adhesives. Because reflector backing panels are used in this first variant, the reflectors may be made so as to be flexible, relying upon the underlying reflector backing panels to provide a desired arcuate conformational stability. Suitable flexible reflectors are described in an application entitled "An Improved Solar Energy Concentrating System Having Replaceable Reflectors", filed concurrently herewith.

As part of the roofing elements that form a weathertight seal, each module includes a spanning member cap means. The spanning member cap means is connected either to the top of a roof spanning member, the upper edge of a reflector, or the upper edge of a reflector backing panel. (For the purposes of the present invention, an "underlying cap support means" includes the top of the roof spanning member, the upper edge of the reflector, or the upper edge of the reflector backing panel.) The spanning member cap means extends lengthwise for the length of the roof spanning member and extends laterally across the roof spanning member. The spanning member cap means is dimensioned and configured so as to form a weathertight seal with either the reflector backing panels or the reflectors, and the roof spanning member over which the spanning cap means is disposed.

If the distal or proximal end of a module does not connect to another module, (an outside end of a terminal module), then another weathertight roofing element present on a roof module can be the end cap means. The end cap means is disposed at the outside end of the terminal module, so as to seal the exposed end formed by the reflector backing panel and its reflector. The end cap means is connected to otherwise exposed roof elements such as an outside reflector, an outside reflector backing panel, an outside spanning member cap means, or an outside load-bearing building member, such as a parapet or a wall. An end cap means may be unitary or formed from several parts. However, regardless of the method of fabrication, each end cap means is dimensioned and configured so as to form a weathertight seal with the roof elements to which the end cap means is connected, thus, sealing the roof. One of ordinary skill in the art, appreciates that the end cap means can vary even within the use on one roof. For example, one wall of a building may be raised above the roof spanning member so as to equal or exceed the height of the part of the spanning member cap means, whereas another wall may reach only to the bottom of the reflector backing panel. Thus, in the former case, the end cap means would simply provide a flashing to the wall for the reflector backing panel or the reflector, and the roof spanning member or the spanning member cap means. However, in the latter case, the end cap means would include a panel having a surface that covers the exposed arcuate area formed by the reflector backing panel or the reflector, and the roof spanning member or the spanning member cap means.

In order to keep leaks from occurring between adjacent reflector backing panels or reflectors, the present roof module includes a weathertight panel sealing means. The panel sealing means, of conventional design, are located at various seams including at the curved lateral edges, at the upper edge, and at the lower edge of each reflector backing panel, at the curved lateral edges, at the upper edge, and at the lower edge of each reflector, or a combination of at the curved lateral edges, at the upper edge, and at the lower edge of each reflector backing panel, and at the curved lateral edges reflectors, at the upper edge, and at the lower edge of each reflector.

Reflector Module

In a second variant of the present invention, a roof module uses at least one reflector as part of the roofing surface, without the need for reflector backing panels. (In preferred modes, a plurality of reflectors can be used as described above for the reflector backing panels.) The roof module comprises a number of elements, starting with a roof spanning member as described in the above reflector backing panel module variant. On top of the roof spanning member lies at least one reflector. Each reflector has a concave and cylindrically arcuate configuration of up to 180 degrees, a lower edge, an upper edge, and curved lateral edges. If a plurality of reflectors is used, then the reflectors are disposed laterally adjacent to one another in a row above the roof spanning members for up to the entire length of the roof spanning member. At least one of the edges of at least one reflector disposed in each row attaches either to the upper panel support points of the underlying roof spanning member, to the lower panel support points of the underlying roof spanning member, or to a combination of such upper panel support points and lower panel support points. Each reflector is disposed such that the skyward surface is the concave surface. As in conventional solar energy concentrating systems, each reflector has a skyward facing surface that reflects radiant solar energy.

If a plurality of reflectors is used, each reflector is dimensioned and configured along the curved lateral edges wherein the curved lateral edge of a reflector can be placed adjacent along the curved lateral edge of another reflector for the length of the underlying roof spanning member so as to form the row of adjacent reflectors. One of ordinary skill in the art can use various materials to construct a reflector having dimensional and configurational stability, including fabricated metals or alloys with polished or reflectorized surfaces, and molded laminates or composites with reflectorized surfaces. The width and height of each module is determined by the arc length of the reflector. The greater the arc length, the taller and wider the module.

As part of the roofing elements that form a weathertight seal, as in the reflector backing panel roof module, the reflector roof module includes a spanning member cap means. Also, if the module is a terminal reflector roof module, then another weathertight roofing element present is the end cap means. Both of these elements are described above in the reflector backing panel roof module. In order to keep leaks from occurring between adjacent reflector, the roof module includes a weathertight panel sealing means. The panel sealing means, of conventional design, are located at various seams including at the curved lateral edges, at the upper edge, and at the lower edge of each reflector.

PREFERRED EMBODIMENTS

Single Reflector Roof Modules

One preferred embodiment of the present invention uses a single reflector design wherein a reflector, or a plurality of reflectors, having an arc of up to about 120 degrees is disposed on one side of the roof spanning member of a roof module. A non-reflective roofing panel is disposed on the opposite side of the roof spanning member. The single reflector module can have two main formats, the first in which reflectors and reflector backing panels are used, and the second in which only reflectors are used.

Using Reflector Backing Panels

In the first format, each module comprises a number of elements, starting with a roof spanning member having a distal end and a proximal end as described above. At least one reflector backing panel is used as part of the roofing surface, but a plurality of reflector backing panels may be used. Each reflector backing panel has a concave and cylindrically arcuate configuration of up to about 120 degrees, a lower edge, an upper edge, and curved lateral edges. If a plurality are used, the reflector backing panels are disposed laterally adjacent to one another in a row attached to the roof spanning member for up to the entire length of the roof spanning member. At least one of the edges of at least one reflector backing panel disposed in the row attaches either to the upper panel support points of the underlying roof spanning member, to the lower panel support points of the underlying roof spanning member, or to a combination of such upper panel support points and lower panel support points. Each reflector backing panel is disposed such that the skyward surface is the concave surface. Also, each reflector backing panel is dimensioned and configured along the curved lateral edges wherein the curved lateral edge of a reflector backing panel can be placed adjacent along the curved lateral edge of another reflector backing panel for the length of the underlying roof spanning member so as to form the row of adjacent reflector backing panels. One of ordinary skill in the art can use various materials to construct a reflector backing panel including fabricated metals or alloys, and molded laminates or composites. Preferably, the reflector backing panel is a sandwich laminate having aluminum sheet skin on either side and a core of insulating structural foam.

On top of each reflector backing panel lies a reflector. Each reflector has a concave and cylindrically arcuate configuration complementary to an underlying reflector backing panel. The reflector can be rigid or flexible. As in conventional solar energy concentrating systems, each reflector has a skyward facing surface that reflects radiant solar energy. Each reflector has an upper edge, a lower edge, and curved lateral edges. Finally, each reflector is disposed on top of the skyward surface of an underlying reflector backing panel, being attached thereto by conventional mechanical fastening means.

Figure 4:
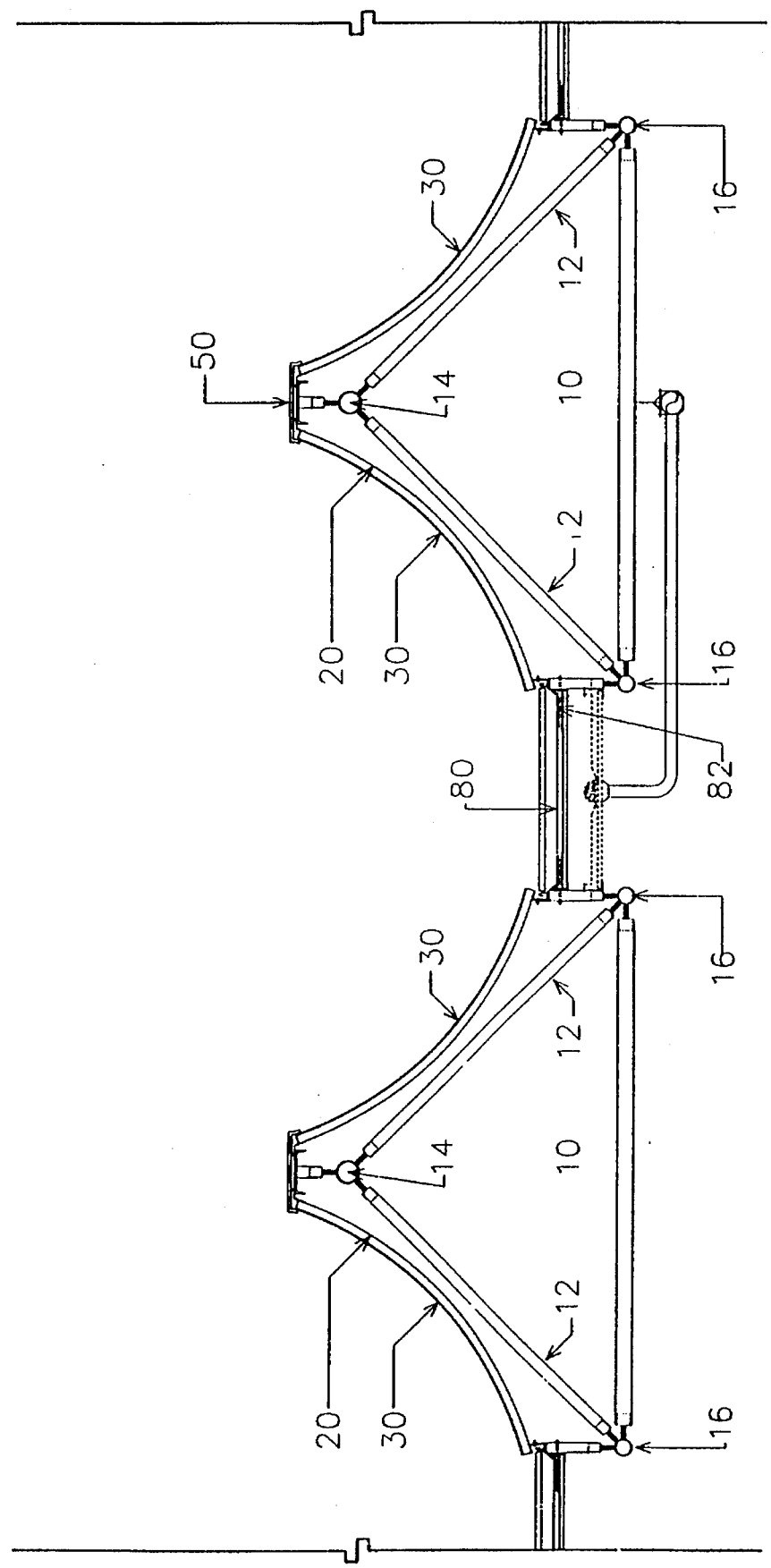
FIG. 4 is a sectional view of two roof modules installed laterally adjacent to each other.

Non-reflective roofing panels are also used on this single reflector design. Each non-reflective roofing panel has curved lateral edges, a lower edge, and an upper edge. At least one non-reflective roofing panel is attached to the side of the roof spanning member opposite to that on which the reflector backing panel is placed. The non-reflective roofing panel is dimensioned and configured such that when a first roof module is abutted laterally to a second roof module, the lower edge of the non-reflective roofing panel on the first roof module is adjacent to the lower edge of the reflector backing panel of the second roof module, as shown in FIG. 4. The lower edge of a non-reflective roofing panel attaches to a lower panel support. The upper edge attaches either to the top of the roof spanning member or to an upper panel support point. If a plurality of non-reflective roofing panels are used, each non-reflective roofing panel is dimensioned and configured along the curved lateral edges wherein the curved lateral edge of a non-reflective roofing panel can be placed adjacent to the curved lateral edge of another non-reflective roofing panel for the length of the underlying roof spanning member, so as to form a row of adjacent non-reflective roofing panels, opposing the row of reflectors. Typically, the installed modules would be oriented so that the non-reflective roofing panels face a northerly direction.

As part of the roofing elements that form a weathertight seal, the roof module includes a spanning member cap means. The spanning member cap means is connected either to the top of a roof spanning member, the upper edge of a reflector, the upper edge of a non-reflective roofing panel, or the upper edge of a reflector backing panel. The spanning member cap means extends lengthwise for the length of the roof spanning member and extends laterally across the roof spanning member. The spanning member cap means is dimensioned and configured so as to form a weathertight seal with either the reflector backing panels or the reflectors, and the roof spanning member over which the spanning cap means is disposed.

If, when installed, the distal end or the proximal end of a roof module does not connect to another roof module, (an outside end of a terminal module), then another weathertight roofing element present is the end cap means as described above.

In order to keep leaks from occurring between adjacent reflector backing panels or reflectors, the roof module includes weathertight panel sealing means. The panel sealing means, of conventional design, are located at various seams including at the curved lateral edges, at the upper edge, and at the lower edge of each reflector backing panel, at the curved lateral edges, at the upper edge, and at the lower edge of each reflector, at the curved lateral edges, at the upper edge, and at the lower edge of the non-reflective roofing panels, or a combination of all of the above.

In order to gather reflect solar energy once installed, each module is designed to be part of a solar energy concentrating system that uses a reflected solar energy collector. Thus, each module will have a mounting means for a collector support means which is disposed above each row of adjacent reflectors in a module.

Using Reflectors Only

In the second format of the single reflector roof module embodiments, at least one reflector, preferably a plurality of reflectors, is used as part of the roofing surface, without the need for reflector backing panels. The reflector is configured of a material designed with sufficient strength to have dimensional and configurational stability to maintain the predetermined arcuate configuration. The reflector attaches in the same manner as described above for the reflector backing panel.

Figure 1:
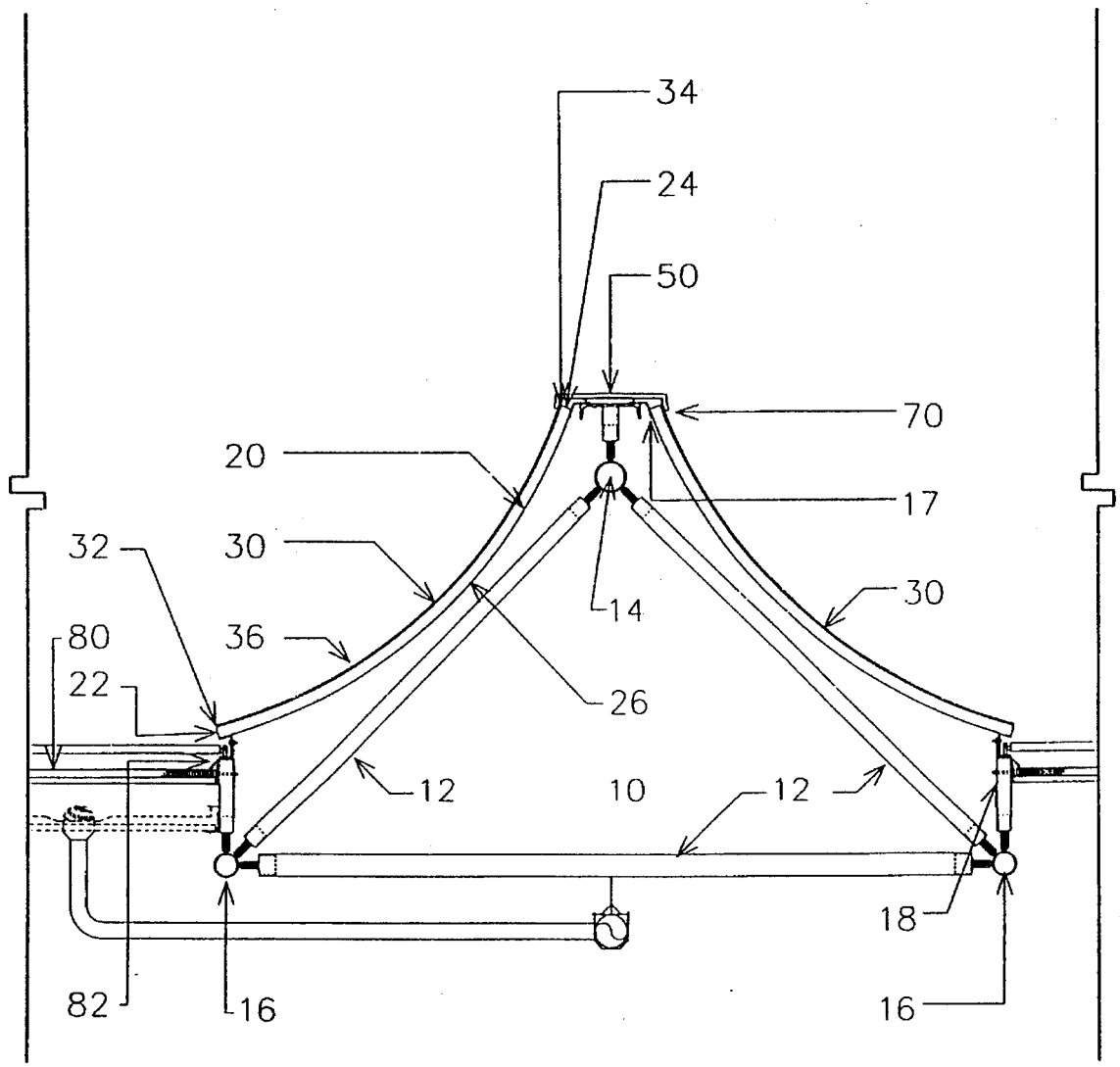
FIG. 1 is a sectional view of a roof module using a reflector on either side of the roof spanning member.
Figure 2:
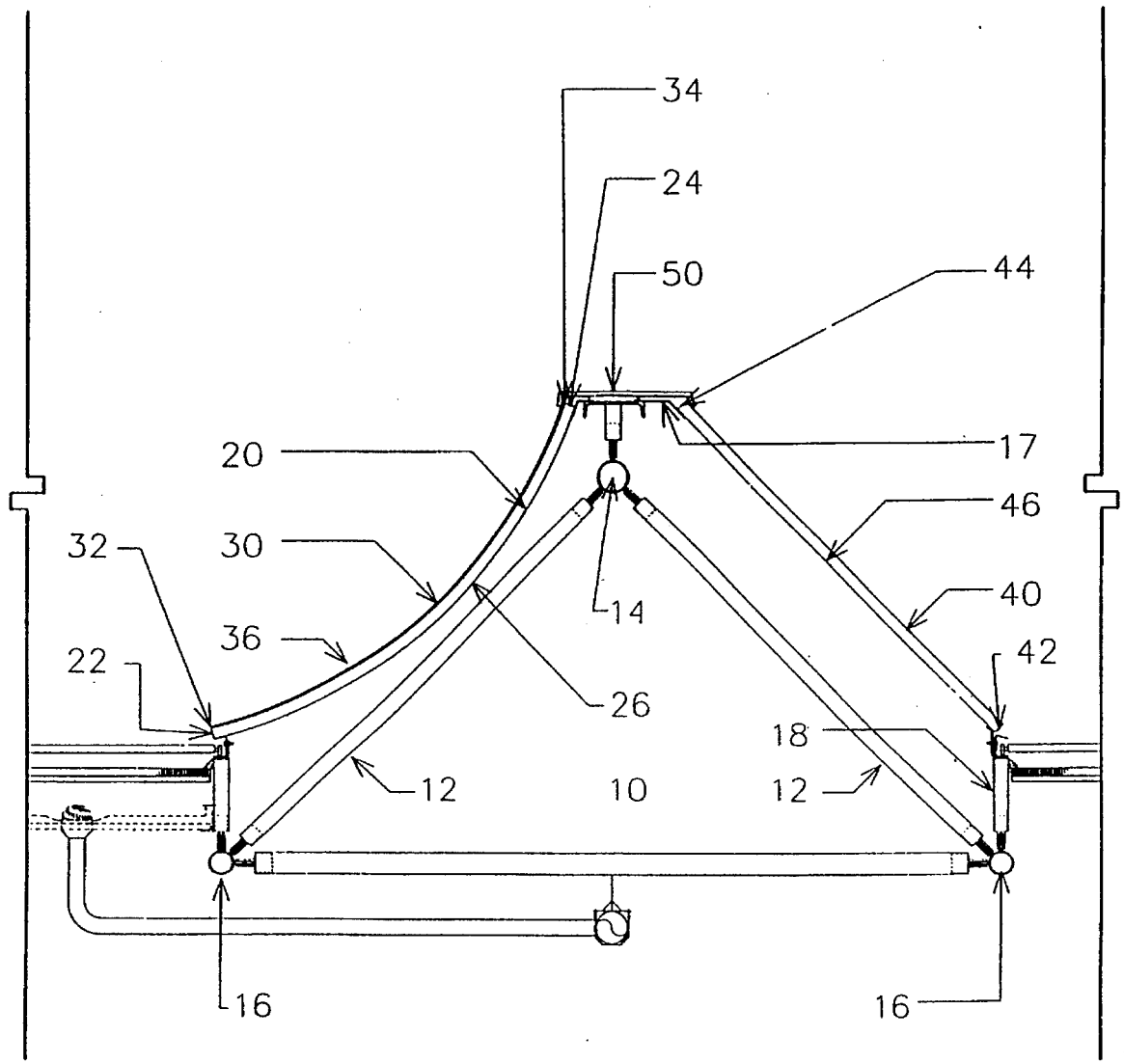
FIG. 2 is a sectional view of a roof module using a reflector on one side of the roof spanning member and a non-reflective roofing panel on the other side.

FIG. 2 illustrates a single reflector design that uses reflector backing panels. If a new structure is being built, then one would prefer to orient the roof module such that the roof spanning member is oriented in a lengthwise direction, i.e., follows the direction formed by the lower edge of the reflectors, which is within 30 degrees of a true East-West axis. However, the present invention can be used on structures having any orientation. In this preferred embodiment, a simple space truss (10) is used as the roof spanning member. The space truss has a plurality of web members (12) disposed between an upper chord (14) and two lower chords (16). Upper panel support points (17) are located near the upper chord, and the lower panel support points (18) are located on the lower chords, as shown in FIGS. 1, 2, and 4. The simple space truss is dimensioned and configured to support the weight of all of the roof supported elements described below, as well as conventional dead loads, such as roof-mounted air conditioning elements, and live loads, such as wind and snow.

A reflector backing panel (20) underlies each solar energy concentrating reflector (30). This reflector backing panel has a concave and cylindrically arcuate configuration of up to about 120 degrees, a lower edge (22), an upper edge (24), and curved lateral edges (26). The reflector backing panels are dimensioned and configured along the curved lateral edges such that one reflector backing panel can be located adjacent to another reflector backing panel so as to form a row of reflector backing panels extending for up to the length of the underlying space truss. In addition, the reflector backing panel is dimensioned and configured so as to provide dimensional or configurational stability to the overlying reflector. Suitable embodiments of the reflector backing panel are described above.

A plurality of flexible solar energy concentrating reflector are used. Each reflector (30) is flexible enough to assume a concave and cylindrically arcuate configuration complementary to the underlying reflector backing panel. Each reflector has a lower edge (32), an upper edge (34), and curved lateral edges (36). The skyward surface of the reflector is the concave surface. Each reflector is dimensioned and configured along the curved lateral edges such that one reflector can be located adjacent to another reflector so as to form a row of reflector extending for up to the length of the underlying space truss. Such a reflector can be comprised of a ultraviolet-stabilized plastic having a reflectorized concave surface. Particularly suitable for reflectors is an ultraviolet-stabilized acrylic having a thickness of 1.6 mm wherein the underside of the concave surface of the acrylic has aluminum vapor-deposited thereon, providing a reflectivity of at least 75%, preferably at least 90%. Alternatively, the reflector can be made from co-extruded polymers having a reflectivity based on the difference in the indices of refraction of the two polymers.

Non-reflective roofing panels are used on the opposite side of the roof spanning member. Each non-reflective roofing panel (40) has lateral edges (46), a lower edge (42), and an upper edge (44). The lower edge attaches to a lower panel support point. The upper edge attaches to an upper panel support point on top of a simple space truss. Each non-reflective roofing panel is dimensioned and configured along the lateral edges wherein the lateral edge (46) of a non-reflective roofing panel can be placed adjacent to the lateral edge of another non-reflective roofing panel extending for up to the length of the underlying roof spanning member, so as to form a row of adjacent non-reflective roofing panels. Some of these non-reflective roofing panels can be transparent or translucent for daylighting.

Figure 5:
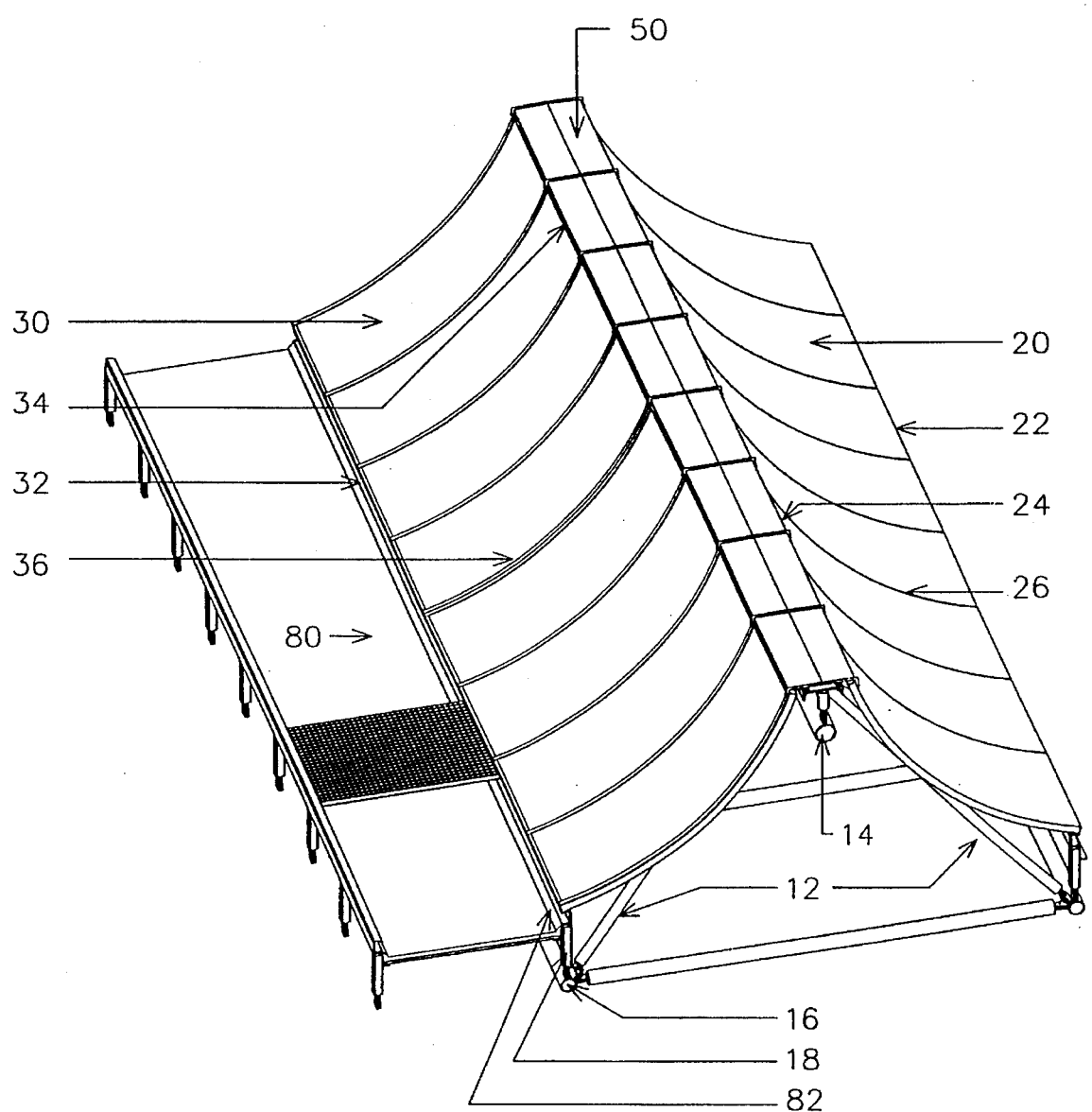
FIG. 5 is an isometric view of two roof modules installed distal end to proximal end.

As part of the roofing elements that form a weathertight seal, the present roof module includes a spanning member cap means (50). The spanning member cap means is connected to the top of the simple space truss. The spanning member cap means extends lengthwise for the length of the roof spanning member and extends laterally across the roof spanning member. As shown in FIGS. 2 and 5, the spanning member cap means is dimensioned and configured so as to form a weathertight seal with the reflector backing panels, the non-reflective roofing panels, and the roof spanning member over which the spanning cap means is disposed.

Another weathertight roofing element present in terminal modules is the end cap means. In such cases, the present invention includes an end cap means, not shown, being situated or disposed at the outside or end of the roof spanning member, so as to seal the exposed end formed by the reflector backing panel and its reflector. Each end cap means is connected to an outside reflector backing panel, an outside non-reflective panel, and the end of the spanning member cap means. Each end cap means is dimensioned and configured so as to form a weathertight seal with the roof elements to which the end cap means is connected, thus, sealing the roof.

In order to keep leaks from occurring between adjacent reflector backing panels or reflectors, the present invention includes weathertight panel sealing means. The panel sealing means (70) shown in FIG. 5, are located at various seams including the curved lateral edges between adjacent reflector backing panels, at the upper edge and at the lower edge of each reflector backing panel, at the curved lateral edges between adjacent non-reflective roofing panels, and at the upper edge and at the lower edge of each non-reflective roofing panels.

Double Reflector Roof Modules

An alternative preferred embodiment of the present invention is to provide for a first reflector and a second reflector on either side of the roof spanning member of a roof module. Each reflector extends downward such that when a first module is abutted laterally to a second module, the first reflector on the first module and either the first reflector or the second reflector on the second module are paired so as to form an up to a 180 degree cylindrically arcuate form. As with the single reflector roof modules, there are two main formats, the first in which reflectors and reflector backing panels are used, and the second in which only reflectors are used. As in previously described embodiments, the roof comprises a number of elements, starting with a roof spanning member as previously described above. Typically, these modules would be installed with the roof spanning members having a North/South lengthwise orientation.

Using Reflector Backing Panels

In the first format for double reflector roof modules, at least two, preferably a plurality of reflector backing panels are used as part of the roofing surface. Each reflector backing panel has a concave and cylindrically arcuate configuration of up to 90 degrees, a lower edge, an upper edge, and curved lateral edges. If a plurality of panels are used, the reflector backing panels are disposed adjacent to one another in two rows, one attached to either side of the roof spanning member for up to the entire length of the roof spanning member. At least one of the curved lateral edges of at least one reflector backing panel disposed in each row attaches either to the upper panel support points of the underlying roof spanning member, to the lower panel support points of the underlying roof spanning member, or to a combination of such upper and lower attachments. One of ordinary skill in the art can vary the number of support points needed through changing the strength of the reflector backing panel. Thus, each reflector backing panel need not be attached to support points. Each reflector backing panel is disposed such that the skyward surface is the concave surface.

Each reflector backing panel is dimensioned and configured along the curved lateral edges wherein the curved lateral edge of a reflector backing panel can be placed adjacent along the curved lateral edge of another reflector backing panel for the length of the underlying roof spanning member so as to form the row of adjacent reflector backing panels. In addition, the lower edge of each reflector backing panel is dimensioned and configured such that the lower edges of the reflector backing panels or the reflectors in a first module can be located adjacent to the lower edge to a second, arcuately paired reflector backing panel or reflector. One of ordinary skill in the art can use various materials to construct a reflector backing panel including fabricated metals or alloys, and molded laminates or composites, as described above.

On top of the reflector backing panel lies a reflector. Each reflector has a concave and cylindrically arcuate configuration complementary to an underlying reflector backing panel. As in conventional solar energy concentrating systems, each reflector has a skyward facing surface that reflects radiant solar energy. The reflector has an upper edge, a lower edge, and curved lateral edges. Finally, each reflector is disposed on top of the skyward surface of an underlying reflector backing panel, and is constructed and attached as described above.

As part of the roofing elements that form a weathertight seal, the present invention includes a spanning member cap means. The spanning member cap means is connected either to the top of a roof spanning member, the upper edge of a reflector, or the upper edge of a reflector backing panel. The spanning member cap means extends lengthwise for the length of the roof spanning member and extends laterally across the roof spanning member. The spanning member cap means is dimensioned and configured so as to form a weathertight seal with either the reflector backing panels or the reflectors, and the roof spanning member over which the spanning cap means is disposed.

A weathertight roofing element present in terminal or end roof modules is the end cap means. In such cases, an end cap means is disposed at the outside or end of the roof spanning member, so as to seal the exposed end formed by the reflector backing panel and its reflector. The end cap means is connected and configured as described above.

In order to keep leaks from occurring between adjacent reflector backing panels or reflectors, the present invention includes weathertight panel sealing means. The panel sealing means, of conventional design, are located at various seams including at the curved lateral edges, at the upper edge, and at the lower edge of each reflector backing panel, at the curved lateral edges, at the upper edge, and at lower edge of each reflector, or a combination of the above.

Using Reflectors Only

In the second format for double reflector roof modules, at least two reflectors, preferably a plurality of reflectors, is used as part of the roofing surface, without the need for reflector backing panels. Each reflector is configured of a material designed with sufficient strength to have dimensional and configurational stability to maintain the predetermined arcuate configuration. Each reflector attaches to either side of the roof spanning member in the same manner that the reflector backing panel does as described above. Rows of reflectors can be used.

As part of the roofing elements that form a weathertight seal, this variant includes a spanning member cap means. The spanning member cap means is connected either to the top of a roof spanning member or the upper edge of a reflector. The spanning member cap means extends lengthwise for the length of the roof spanning member and extends laterally across the roof spanning member. The spanning member cap means is dimensioned and configured so as to form a weathertight seal with the reflectors on either side of the roof spanning member and the roof spanning member over which the spanning cap means is disposed.

Another weathertight roofing element present in end modules is the end cap means as described above.

In order to keep leaks from occurring between adjacent reflectors, the present invention includes weathertight panel sealing means. The panel sealing means, of conventional design, are located at various seams including at the curved lateral edges, at the upper edge, and at the lower edge of each reflector.

FIG. 1 illustrates a double reflector design that uses reflector backing panels. If a new structure is being built, then one would prefer to orient the load bearing members of the new structure such that the roof spanning member in the module is oriented in a lengthwise direction, i.e., follows the direction formed by the lower edge of the reflectors, which is within 30 degrees of a true North-South axis. However, the present invention can be used on structures having any orientation. In this preferred embodiment, a simple space truss (10) is used as described above in the embodiment for the single reflector design.

A reflector backing panel (20) underlies each solar energy concentrating reflector (30). This reflector backing panel has a concave and cylindrically arcuate configuration of up to 90 degrees, a lower edge (22), an upper edge (24), and curved lateral edges (26). The reflector backing panels are dimensioned and configured along the curved lateral edges such that one reflector backing panel can be located adjacent to another reflector backing panel so as to form a row of reflector backing panels extending for up to the length of the underlying space truss. Each reflector backing panel is connected to the upper panel support points (17) and the lower panel support points (18) by conventional fastening means. In addition, each reflector backing panel is dimensioned and configured so as to provide dimensional or configurational stability to the overlying reflector. Suitable embodiments of the reflector backing panel for this embodiment are described above.

A plurality of flexible solar energy concentrating reflector are used. Each reflector (30) is flexible enough to assume a concave and cylindrically arcuate configuration complementary to the underlying reflector backing panel. Each reflector has a lower edge (32), an upper edge (34), and curved lateral edges (36). The skyward surface of the reflector is the concave surface. Each reflector is dimensioned and configured along the curved lateral edges such that one reflector can be located adjacent to another reflector so as to form a row of reflector extending for up to the length of the underlying space truss. Each reflector is secured to the underlying reflector backing panel either by conventional fastening means or by conventional adhesives. Suitable reflectors are described above.

As part of the roofing elements that form a weathertight seal, each roof module includes a spanning member cap means (50). The spanning member cap means (50) is connected to the top of a roof spanning member. Each spanning member cap means extends lengthwise for the length of the roof spanning member and extends laterally across the roof spanning member. As shown in FIG. 1, each spanning member cap means is dimensioned and configured so as to form a weathertight seal with either the reflector backing panels or the reflectors on either side of the roof spanning member, and the roof spanning member over which the spanning cap means is disposed.

Another weathertight roofing element present in terminal modules is the end cap means. The end cap means, not shown, is situated or disposed at the outside end of the roof spanning member, so as to seal the exposed end formed by the reflector backing panel and its reflector. The end cap means is connected to an outside reflector backing panel and the end of the spanning member cap means. The end cap means is dimensioned and configured so as to form a weathertight seal with the roof elements to which the end cap means is connected, thus, sealing the roof.

In order to keep leaks from occurring between adjacent reflector backing panels or reflectors, the present invention includes weathertight panel sealing means. The panel sealing means, of conventional design, are located at various panel seams including the curved lateral edges between adjacent reflector backing panels, and at the upper edge and at the lower edge of each reflector backing panel.

Additional Roof Module Elements

Figure 3:
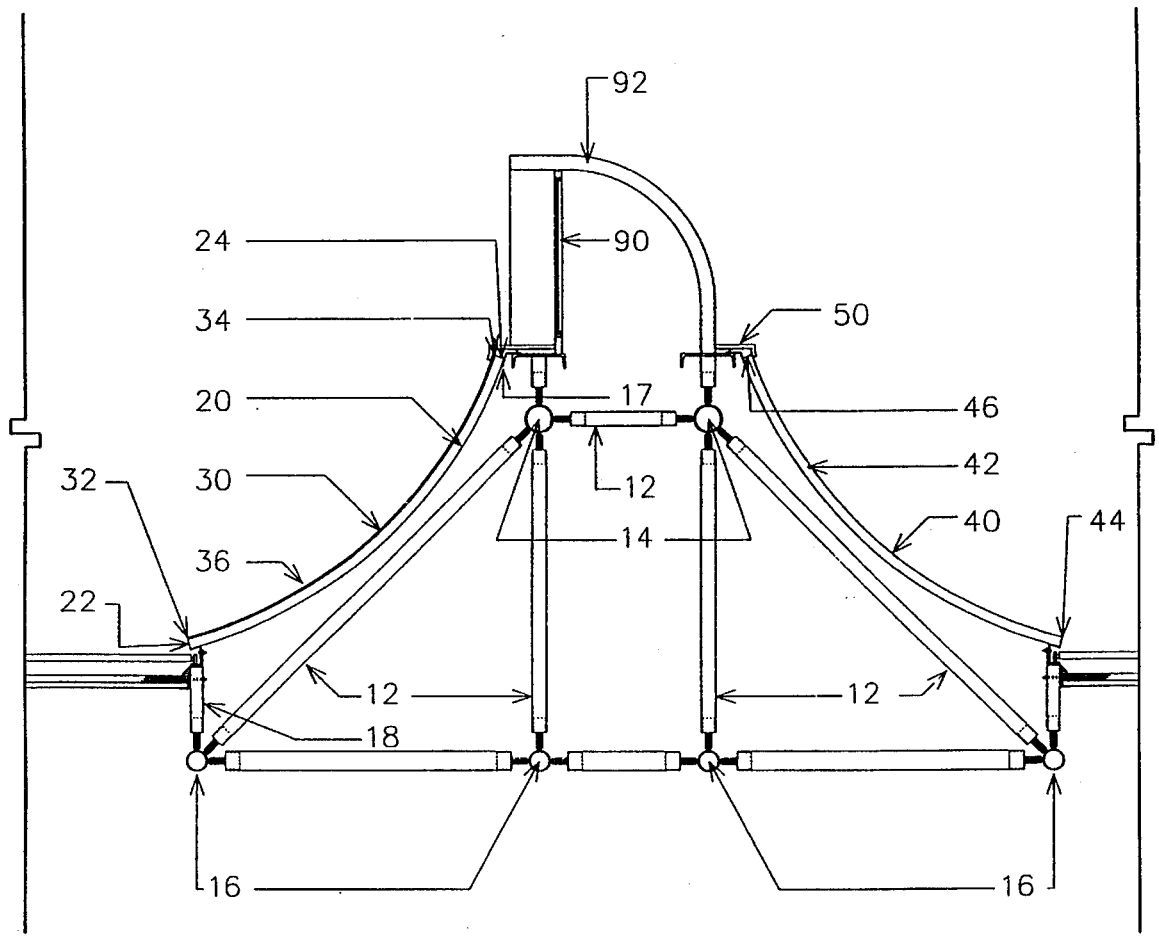
FIG. 3 is a sectional view of a roof module using a reflector on either side of a complex space truss and incorporating a daylighting means.

Preferred embodiments of the present invention can include a number of additional features. For example, when selecting a truss for the roof spanning member, one can select between a simple space truss, as shown in FIG. 1, or a complex space truss, as shown in FIG. 3. Complex space trusses are preferred if incorporating daylighting means into the spanning member cap means, as shown in FIG. 3. In either truss, the upper panel support points are located at or near the upper chord, and the lower panel support points are located at or near the lower chords.

In all embodiments using reflector backing panels, the reflectors and the underlying reflector backing panels can be dimensioned and configured such that each reflector may be detached without removing the underlying reflector backing panel and without affecting the weathertight panel sealing means. Such a configuration allows for the easy replacement of reflectors without disturbing the weathertight integrity of the roof.

Another preferred feature for the present roof module is to provide for gutter means at the lower edges of the reflectors. Two benefits arise from this practice. First, the gutter means remove debris from settling on the reflector surface, maintaining a high reflectivity, and thus, energy yield for the solar energy concentrating components. Second, the gutter can be designed to be wide enough and strong enough to support a person. Thus, maintenance can be performed on the roof without having to step on the reflectors, thereby preventing damage to the reflective surfaces. The present roof module can have at least one gutter means attached thereto. Each gutter means (80) is located below the lower edge of the reflector backing panel or the lower edge of the reflector, as shown in FIG. 1 to 5. Each gutter means extends the length of the roof spanning member. The gutter means is connected either to the underlying roof spanning member, the lower panel support points, the adjacent reflectors, the adjacent reflector backing panels or a combination thereof. (For the purposes of the present invention, an "underlying gutter support means" includes the underlying roof spanning member, the lower panel support points, the reflector, the reflector backing panel, or a combination thereof.) To maintain the weathertight integrity of the present roof, a weathertight gutter sealing means is included with the gutter means. The gutter sealing means (82) is disposed between each gutter means and the gutter seams which include the lower edges of the adjacent reflector backing panels, the lower edges of the adjacent reflectors, or a combination thereof. Such sealing means are of conventional design and are known to those of skill in the art.

To enhance the utility of the present roof modules, insulation means can be provided for the various roof surface components. Thus, the reflector backing panels, reflectors, end cap means, spanning member cap means, and gutter means can have an insulating means disposed beneath or attached to these elements or incorporated into these elements gutter means.

Another preferred feature for the present invention is to use daylighting means in the roof module so as to lower lighting cost for the underlying structure by providing ambient light to go into the structure. A daylighting means can be either a transparent or translucent material. One way of providing daylighting comprises having the spanning member cap means being dimensioned and configured such that at least one daylighting means is located on a surface of the spanning member cap means. In other words, flat glass panels can be inset into the spanning cap means, not shown. A second way is to use a raised transparent or substantially translucent daylighting panel (90), as shown in FIG. 3. Such a panel is disposed substantially vertically from the surface of the spanning member cap means. A daylighting panel housing (92) is attached to the spanning member cap means, said housing being dimensioned and configured to form a weathertight seal between the raised daylighting panel and the spanning member cap means. A third way of providing daylighting is to use a transparent or substantially translucent daylighting panel in place of a reflector, or if used, the reflector and the underlying reflector backing panel. This daylighting panel would be dimensioned and configured to form a weathertight seal with adjacent gutter seams such as either an adjacent daylighting means, an adjacent reflector, an adjacent reflector backing panel, or a combination thereof. A fourth way to provide daylight is shown in the preferred single reflector designs. Here, one or more of the non-reflective roofing panels can be substituted for with a transparent or translucent replacement daylighting panel. Any combination of the above, in the correct format, can be used to provide a desired level of daylighting.

Another roof module feature is to integrate weathertight panel sealing means into the reflectors, the reflector backing panels, the non-reflective roofing panels, or the daylighting panels by designing the edges of these roofing surface elements to have an interlocking means that does not allow water to penetrate between such adjacent roofing elements.

All publications or unpublished patent applications mentioned herein are hereby incorporated by reference thereto.

Other embodiments of the present invention are not presented here which are obvious to those of ordinary skill in the art, now or during the term of any patent issuing from this patent specification, and thus, are within the spirit and scope of the present invention.

We claim:

1. A roof module having an integral solar energy concentrating reflector comprising:
   a) a roof spanning member having a distal end and a proximal end, said roof spanning member having a plurality of underlying reflector support point means, and said roof spanning member being dimensioned and configured to support the weight of all of the roof-supported elements in paragraphs b) to f), as well as conventional roof-mounted dead loads and live loads;
   b) an attachment means disposed on an end of the roof spanning member, said attachment means being dimensioned and configured to connect to an end of a second roof spanning member in a second module;
   c) at least one reflector backing panel, each reflector backing panel having a concave and cylindrically arcuate configuration of up to 180 degrees, a lower edge, an upper edge, and curved lateral edges, wherein at least one of the curved lateral edges of at least one reflector backing panel attaches to at least one underlying panel support point means, each reflector backing panel being disposed such that the skyward surface of each reflector backing panel is the concave surface;
   d) at least one solar energy concentrating reflector, each reflector having a concave and cylindrically arcuate configuration complementary to an underlying reflector backing panel, each reflector having a skyward facing surface that reflects radiant solar energy, each reflector having an upper edge, a lower edge, and curved lateral edges, and each reflector being disposed on top of the skyward surface of an underlying reflector backing panel;
   e) a spanning member cap means connected to an underlying cap support means, the spanning member cap means extending lengthwise for the length of the roof spanning member and extending laterally across the roof spanning member, wherein the spanning member cap means is dimensioned and configured so as to form a weathertight seal with the reflector backing panel and the roof spanning member; and
   f) weathertight panel sealing means, said panel sealing means being located at panel seams.

2. The roof module of claim 1 also comprising:
   a) a plurality of reflector backing panels, wherein each reflector backing panel is dimensioned and configured along the curved lateral edges wherein the curved lateral edge of a reflector backing panel can be placed adjacent along the curved lateral edge of another reflector backing panel extending for up to the length of the underlying roof spanning member so as to form a row of adjacent reflector backing panels;
   b) a plurality of reflectors, wherein each reflector is dimensioned and configured along the curved lateral edges wherein the curved lateral edge of a reflector can be placed adjacent along the curved lateral edge of another reflector extending for up to the length of the underlying reflector backing panels so as to form a row of adjacent reflector backing panels; and
   c) weathertight panel sealing means being located at the panel seams.

3. The roof module of claim 2 wherein the weathertight panel sealing means are integrated into the panel seams.

4. The roof module of claim 2 having at least one reflector and the underlying reflector backing panel replaced by a daylighting panel, said daylighting panel being dimensioned and configured to form a weathertight seal with adjacent panel seams.

5. The roof module of claim 2 having at least one reflector and the underlying reflector backing panel replaced by a non-reflective roofing panel, said non-reflective roofing panel being dimensioned and configured to form a weathertight seal with adjacent panel seams.

6. The roof module of claim above 2 having at least one reflector and the underlying reflector backing panel or at least one non-reflective roofing panel replaced by a daylighting panel, said daylighting panel being dimensioned and configured to form a weathertight seal with adjacent panel seams.

7. The roof module of claim 1 wherein the module has at least one end cap means, each end cap means being connected to otherwise exposed roof elements, and each end cap means being dimensioned and configured so as to form a weathertight seal with the otherwise exposed roof elements to which the end cap means is connected.

8. The roof module of claim 1 wherein the roof spanning member comprises a space truss, the space truss having a plurality of web sections, at least one upper chord, and at least two lower chords, one on either side of the upper chord, wherein the upper panel support points are located near the upper chord and the lower panel support points are located near the lower chords.

9. The roof module of claim 1 wherein the reflectors are dimensioned and configured such that each reflector may be detached, removed, and replaced individually.

10. The roof module of claim 1 also comprising:
   a) at least one gutter means, each gutter means extending the length of the roof spanning member and being located below the lower edge of the reflector, said gutter means being connected to an underlying gutter support means; and
   b) weathertight gutter sealing means disposed between each gutter means and gutter seams.

11. The roof module of claim 10 wherein the gutter means has an insulating means disposed beneath the gutter means.

12. The roof module of claim 11 wherein the reflector backing panels, the end cap means, and the spanning member cap means have an insulating means disposed beneath.

13. The roof module of claim 10 wherein the reflector backing panels, the end cap means, and the spanning member cap means have an insulating means disposed beneath.

14. The roof module of claim 1 wherein each reflector comprises a ultraviolet-stabilized plastic having a reflectorized concave surface.

15. The roof module of claim 1 wherein the spanning member cap means is dimensioned and configured such that at least one daylighting means is located on a surface of the spanning member cap means.

16. The roof module of claim 15 having at least one daylighting means, wherein each daylighting means comprises:
   a) a raised daylighting panel disposed substantially vertically from the surface of the spanning member cap means; and
   b) a daylighting panel housing attached to the spanning member cap means, said housing being dimensioned and configured to form a weathertight seal between the raised daylighting panel and the spanning member cap means.

17. A roof module having an integral solar energy concentrating reflector comprising:
   a) a roof spanning members having a distal end and a proximal end, said roof spanning member having a plurality of underlying reflector support point means, and said roof spanning member being dimensioned and configured to support the weight of all of the roof-supported elements in paragraphs b) to e), as well as conventional roof-mounted dead loads and live loads;
   b) an attachment means disposed on an end of the roof spanning member, said attachment means being dimensioned and configured to connect to an end of a second roof spanning member in a second module;
   c) at least one solar energy concentrating reflector, each reflector having a concave and cylindrically arcuate configuration of up to 180 degrees, a lower edge, an upper edge, and curved lateral edges, wherein the upper edge or the upper portion of at least one of the curved lateral edges of at least one reflector, disposed in a row of adjacent reflectors, attaches to an underlying reflector support point means, each reflector being disposed such that the skyward surface of each reflector is the concave surface, each reflector having a skyward facing surface that reflects radiant solar energy;
   d) a spanning member cap means connected to an underlying cap support means, the spanning member cap means extending lengthwise for the length of the roof spanning member and extending laterally across the roof spanning member, wherein the spanning member cap means is dimensioned and configured so as to form a weathertight seal with the reflector and the roof spanning member; and
   e) a plurality of weathertight panel sealing means, said panel sealing means being located at the curved lateral edges, the upper edge, and the lower edge of each reflector.

18. The roof module of claim 17 also comprising:
   a) a plurality of reflectors, wherein each reflector is dimensioned and configured along the curved lateral edges wherein the curved lateral edge of a reflector can be placed adjacent along the curved lateral edge of another reflector extending for up to the length of the underlying roof spanning member so as to form a row of adjacent reflectors; and
   b) the weathertight panel sealing means being located at the panel seams.

19. The roof module of claim 18 having at least one daylighting means, wherein said daylighting means comprises a daylighting panel disposed in place of a reflector, said daylighting panel being dimensioned and configured to form a weathertight seal with adjacent panel seams.

20. The roof module of claim 17 wherein the module has at least one end cap means, each end cap means being connected to otherwise exposed roof elements, and each end cap means being dimensioned and configured so as to form a weathertight seal with the roof elements to which the end cap means is connected.

21. The roof module of claim 20 having at least one reflector and the underlying reflector backing panel replaced by a daylighting panel, said daylighting panel being dimensioned and configured to form a weathertight seal with adjacent panel seams.

22. The roof module of claim 20 having at least one reflector and the underlying reflector backing panel replaced by a non-reflective roofing panel, said non-reflective roofing panel being dimensioned and configured to form a weathertight seal with adjacent panel seams.

23. The roof module of claim 22 having at least one reflector and the underlying reflector backing panel or at least one non-reflective roofing panel replaced by a daylighting panel, said daylighting panel being dimensioned and configured to form a weathertight seal with adjacent panel seams.

24. The roof module of claim 17 wherein the roof spanning member comprises a space truss, the space truss having a plurality of web sections, at least one upper chord, and at least two lower chords, one on either side of the upper chord, wherein the upper panel support points are located near the upper chord and the lower panel support points are located near the lower chords.

25. The roof module of claim 17 wherein the reflectors are dimensioned and configured such that each reflector may be detached, removed, and replaced individually.

26. The roof module of claim 17 also comprising:
   a) at least one gutter means, each gutter means extending the length of the roof spanning member and being located below the lower edge of the reflector, said gutter means being connected to an underlying gutter support means; and b) weathertight gutter sealing means disposed between each gutter means and gutter seams.

27. The roof module of claim 17 wherein each reflector comprises a ultraviolet-stabilized plastic having a reflectorized concave surface.

28. The roof module of claim 17 wherein the weathertight panel sealing means are integrated into the curved lateral edges, the upper edge, and the lower edge of each reflector.

29. The roof module of claim 17 wherein the spanning member cap means are dimensioned and configured such that at least one daylighting means is located on a surface of the spanning member cap means.

30. The roof module of claim 17 having at least one daylighting means, wherein each daylighting means comprises:
    a) a daylighting panel disposed substantially vertically from the surface of the spanning member cap means; and
    b) a daylighting panel housing attached to the spanning member cap means, said housing being dimensioned and configured to form a weathertight seal between the raised daylighting panel and the spanning member cap means.

31. A roof module having an integral solar energy concentrating reflector comprising:
    a) a roof spanning member having a distal end and a proximal end, said roof spanning member having a plurality of underlying reflector support point means, and said roof spanning member being dimensioned and configured to support the weight of all of the roof-supported elements in paragraphs b) to g), as well as conventional roof-mounted dead loads and live loads;
    b) an attachment means disposed on an end of the roof spanning member, said attachment means being dimensioned and configured to connect to an end of a second roof spanning member in a second module;
    c) at least one reflector backing panel disposed on a first side of the roof spanning member, each reflector backing panel having a concave and cylindrically arcuate configuration of up to about 120 degrees, a lower edge, an upper edge, and curved lateral edges, wherein at least one of the curved lateral edges of at least one reflector backing panel attaches to an underlying reflector support point means, each reflector baking panel being disposed such that the skyward surface of the reflector backing panel is the concave surface;
    d) at least one non-reflective roofing panel disposed on a second opposite side of the roof spanning member, each non-reflective roofing panel having lateral edges, a lower edge, and an upper edge;
    e) at least one solar energy concentrating reflector, each reflector having a concave and cylindrically arcuate configuration complementary to an underlying reflector backing panel, each reflector having a skyward surface that reflects radiant solar energy, each reflector having an upper edge, a lower edge, and curved lateral edges, and each reflector being disposed on top of the skyward surface of an underlying reflector backing panel;
    f) a spanning member cap means connected either to the top of the roof spanning member, the upper edge of the reflector, or the upper edge of the reflector backing panel, the spanning member cap means extending lengthwise for the length of the roof spanning member and extending laterally across the roof spanning member, wherein the spanning member cap means is dimensioned and configured so as to form a weathertight seal with the reflector backing panel and the roof spanning member; and
    g) weathertight panel sealing means, said panel sealing means being located at the curved lateral edges, the upper edge, and the lower edge of each reflector backing panel, at the curved lateral edges, the upper edge, and the lower edge of each reflector, at the curved lateral edges, the upper edge, and the lower edge of each non-reflective roofing panels, or a combination thereof.

32. The roof module of claim 31 also comprising:
    a) a plurality of reflector backing panels, wherein each reflector backing panel is dimensioned and configured along the curved lateral edges wherein the curved lateral edge of a reflector backing panel can be placed adjacent along the curved lateral edge of another reflector backing panel extending for up to the length of the underlying roof spanning member so as to form a row of adjacent reflector backing panels;
    b) a plurality of reflectors, wherein each reflector is dimensioned and configured along the curved lateral edges wherein the curved lateral edge of a reflector can be placed adjacent along the curved lateral edge of another reflector extending for up to the length of the underlying reflector backing panels so as to form a row of adjacent reflector backing panels;
    c) a plurality of non-reflective roofing panels, wherein each non-reflective roofing panel is dimensioned and configured along the lateral edges wherein the lateral edge of a non-reflective roofing panel can be placed adjacent to the lateral edge of another non-reflective roofing panel for the length of the underlying roof spanning member so as to form a row of adjacent non-reflective roofing panels; and
    d) weathertight panel sealing means being located at the panel seams.

33. The roof module of claim 32 wherein the weathertight panel sealing means are integrated into the panel seams.

34. The roof module of claim 31 wherein the module has at least one end cap means, each end cap means being connected to otherwise exposed roof elements, and each end cap means being dimensioned and configured so as to form a weathertight seal with the roof elements to which the end cap means is connected.

35. The roof module of claim 31 wherein the roof spanning member comprises a space truss, the space truss having a plurality of web sections, at least one upper chord, and at least two lower chords, one on either side of the upper chord, wherein the upper panel support points are located near the upper chord and the lower panel support points are located near the lower chords.

36. The roof module of claim 31 wherein the reflectors are dimensioned and configured such that each reflector may be detached, removed, and replaced individually.

37. The roof module of claim 31 also comprising:
    a) at least one gutter means, each gutter means extending the length of the roof spanning member and being located below the lower edge of the reflector, said gutter means being connected to an underlying gutter support means; and
    b) weathertight gutter sealing means disposed between each gutter means and adjacent gutter seams.

38. The roof module of claim 37 wherein the gutter means has an insulating means disposed beneath the gutter means.

39. The roof module of claim 38 wherein the reflector backing panels, the end cap means, and the spanning member cap means have an insulating means disposed beneath.

40. The roof module of claim 38 wherein the reflector backing panels, the end cap means, and the spanning member cap means have an insulating means disposed beneath.

41. The roof module of claim 31 wherein each reflector comprises a ultraviolet-stabilized plastic having a reflectorized concave surface.

42. The roof module of claim 31 wherein the spanning member cap means are dimensioned and configured such that at least one daylighting means is located on a surface of the spanning member cap means.

43. The roof module of claim 31 having at least one daylighting means, wherein each daylighting means comprises:

a) a daylighting panel disposed substantially vertically from the surface of the spanning member cap means; and b) a daylighting panel housing attached to the spanning member cap means, said housing being dimensioned and configured to form a weathertight seal between the raised daylighting panel and the spanning member cap means.

44. The roof module of claim 31 wherein the non-reflective roofing panels transmit light.

45. The roof module of claim 31 wherein the non-reflective roofing panels are substantially planar.

46. The roof module of claim 31 wherein the non-reflective roofing panels are disposed in a substantially vertical orientation.

47. A roof module having an integral solar energy concentrating reflector comprising:

a) a roof spanning member having a distal end and a proximal end, each roof spanning member having a plurality of underlying reflector support point means, and each roof spanning member being dimensioned and configured to support the weight of all of the roof-supported elements in paragraphs b) to f), as well as conventional roof-mounted dead loads and live loads;

b) an attachment means disposed on an end of the roof spanning member, said attachment means being dimensioned and configured to connect to an end of a second roof spanning member in a second module;

c) at least one solar energy concentrating reflector disposed on a first side of the roof spanning member, each reflector having a concave and cylindrically arcuate configuration of up to about 120 degrees, a lower edge, an upper edge, and curved lateral edges, wherein the at least one of the curved lateral edges of at least one reflector attaches to an underlying reflector support point means, each reflector being disposed such that the skyward surface of each reflector is the concave surface, and each reflector having a skyward facing surface that reflects radiant solar energy;

d) at least one non-reflective roofing panel disposed on a second, opposite side of the roof spanning member, each non-reflective roofing panel having lateral edges, a lower edge which attaches to the lower edge of an adjacent reflector or a lower panel support point, and an upper edge which attaches to upper panel support points on the roof spanning member;

e) a spanning member cap means connected to an underlying cap support means, said spanning member cap means extending for the length of the roof spanning member and extending laterally across the roof spanning member, wherein said spanning member cap means is dimensioned and configured so as to form a weathertight seal with the reflectors and the roof spanning member; and f) a plurality of weathertight panel sealing means, said panel sealing means being located at the panel seams.

48. The roof module of claim 47 also comprising:

a) a plurality of reflectors, wherein each reflector is dimensioned and configured along the curved lateral edges wherein the curved lateral edge of a reflector can be placed adjacent along the curved lateral edge of another reflector extending for up to the length of the underlying roof spanning member so as to form a row of adjacent reflectors;

b) a plurality of non-reflective roofing panels, each non-reflective roofing panel being dimensioned and configured along the lateral edges wherein the lateral edge of a non-reflective roofing panel can be placed adjacent to the lateral edge of another non-reflective roofing panel extending for up to the length of the underlying roof spanning member so as to form a row of adjacent non-reflective roofing panels; and c) weathertight panel sealing means being located at the panel seams.

49. The roof module of claim 47 wherein the module has at least one end cap means, each end cap means being connected to otherwise exposed roof elements, and each end cap means being dimensioned and configured so as to form a weathertight seal with the roof elements to which the end cap means is connected.

50. The roof module of claim 47 wherein the roof spanning member comprises a space truss, the space truss having a plurality of web sections, at least one upper chord, and at least two lower chords, one on either side of the upper chord, wherein the upper panel support points are located near the upper chord and the lower panel support points are located near the lower chords.

51. The roof module of claim 47 wherein the reflectors are dimensioned and configured such that each reflector may be detached, removed, and replaced individually.

52. The roof module of claim 47 also comprising:

a) at least one gutter means, each gutter means extending the length of the roof spanning member and being located below the lower edge of the reflector or the lower edge of the non-reflective roofing panel, said gutter means being connected to an underlying gutter support means; and b) weathertight gutter sealing means disposed between each gutter means and adjacent gutter seams.

53. The roof module of claim 47 wherein each reflector is comprised of a ultraviolet-stabilized plastic having a reflectorized concave surface.

54. The roof module of claim 47 wherein the weathertight panel sealing means are integrated into the curved lateral edges, the upper edge, and the lower edge of each reflector.

55. The roof module of claim 47 wherein the spanning member cap means are dimensioned and configured such that at least one daylighting means is located on a surface of the spanning member cap means.

56. The roof module of claim 47 having at least one daylighting means, wherein each daylighting means comprises:

a) a daylighting panel disposed substantially vertically from the surface of the spanning member cap means; and b) a daylighting panel housing attached to the spanning member cap means, said housing being dimensioned and configured so as to form a weathertight seal between the raised daylighting panel and the spanning member cap means.

57. The roof module of claim 56 wherein the non-reflective roofing panels transmit light.

58. The roof module of claim 56 wherein the non-reflective roofing panels are substantially planar.

59. The roof module of claim 56 wherein the non-reflective roofing panels are disposed in a substantially vertical orientation.

60. A roof module having an integral solar energy concentrating reflector comprising:
   a) a roof spanning member having a distal end and a proximal end, the roof spanning member having a plurality of upper panel support points, a plurality of underlying reflector support point means, and the roof spanning member being dimensioned and configured to support the weight of all of the roof supported elements in paragraphs b) to f), as well as conventional roof-mounted dead loads and live loads; b) an attachment means disposed on an end of the roof spanning member, said attachment means being dimensioned and configured to connect to an end of a second roof spanning member in a second module;
   c) at least two reflector backing panels, at least one reflector backing panel being disposed on either side of the roof spanning member, each reflector backing panel having a concave and cylindrically arcuate configuration of up to 90 degrees, a lower edge, an upper edge, and curved lateral edges, wherein at least one of the edges of each reflector backing panel attaches to an underlying reflector support point means, such that the skyward surface of the reflector backing panel is the concave surface, the lower edge of each reflector backing panel being dimensioned and configured along the lower edge such that the lower edge of a first reflector backing panel on a first module can be adjacent to the lower edge of a second arcuately paired reflector backing panel on a second module,
   d) at least two solar energy concentrating reflectors, each reflector having a concave and cylindrically arcuate configuration complementary to an underlying reflector backing panel, each reflector having a skyward facing surface that reflects radiant solar energy, each reflector having an upper edge, a lower edge, and curved lateral edges, and each reflector being disposed on top of the skyward surface of an underlying reflector backing panel;
   e) a spanning member cap means, connected to an underlying cap support means, the spanning member cap means extending lengthwise for the length of the roof spanning member and extending laterally across the roof spanning member, wherein the spanning member cap means is dimensioned and configured so as to form a weathertight seal with the reflector backing panels or the reflectors, and the roof spanning member; and
   f) a plurality of weathertight panel sealing means, said panel sealing means being located at the panel seams.

61. The roof module of claim 60 also comprising:
   a) a plurality of reflector backing panels, wherein each reflector backing panel is dimensioned and configured along the curved lateral edges wherein the curved lateral edge of a reflector backing panel can be placed adjacent along the curved lateral edge of another reflector backing panel extending for up to the length of the underlying roof spanning member so as to form a row of adjacent reflector backing panels;
   b) a plurality of reflectors, wherein each reflector is dimensioned and configured along the curved lateral edges wherein the curved lateral edge of a reflector can be placed adjacent along the curved lateral edge of another reflector extending for up to the length of the underlying reflector backing panels so as to form a row of adjacent reflector backing panels; and
   c) weathertight panel sealing means being located at the panel seams.

62. The roof module of claim 61 having at least one reflector and the underlying reflector backing panel replaced by a daylighting panel, said daylighting panel being dimensioned and configured to form a weathertight seal with adjacent panel seams.

63. The roof module of claim 61 having at least one reflector and the underlying reflector backing panel replaced by a non-reflective roofing panel, said non-reflective roofing panel being dimensioned and configured to form a weathertight seal adjacent panel seams.

64. The roof module of claim 60 wherein the module has at least one end cap means, each end cap means being connected to otherwise exposed roof elements, and each end cap means being dimensioned and configured so as to form a weathertight seal with the roof elements to which the end cap means is connected.

65. The roof module of claim 60 wherein the roof spanning member comprises a space truss, the space truss having a plurality of web sections, at least one upper chord, and at least two lower chords, one on either side of the upper chord, wherein the upper panel support points are located near the upper chord and the lower panel support points are located near the lower chords.

66. The roof module of claim 65 wherein the reflectors, the end cap means, and the spanning member cap means each have an insulating means attached thereto.

67. The roof module of claim 65 having at least one reflector and the underlying reflector backing panel or at least one non-reflective roofing panel replaced by a daylighting panel, said daylighting panel being dimensioned and configured to form a weathertight seal with adjacent panel seams.

68. The roof module of claim 60 wherein the reflectors are dimensioned and configured such that each reflector may be detached, removed, and replaced individually.

69. The roof module of claim 60 also comprising:
   a) at least one gutter means, each gutter means spanning the length of the roof spanning member and being located below the lower edge of the reflector, said gutter means being connected to an underlying gutter support means; and
   b) weathertight gutter sealing means disposed between each gutter means and adjacent gutter seams.

70. The roof module of claim 69 wherein the gutter means has an insulating means disposed beneath the gutter means.

71. The roof module of claim 70 wherein the reflectors, the end cap means, and the spanning member cap means each have an insulating means attached thereto.

72. The roof module of claim 71 wherein the weathertight panel sealing means are integrated into the panel edges.

73. The roof module of claim 60 wherein the reflectors are comprised of a ultraviolet-stabilized plastic having a reflectorized concave surface.

74. The roof module of claim 60 wherein the spanning member cap means are dimensioned and configured such that at least one daylighting means is located on a surface of the spanning member cap means.

75. The roof module of claim 74 having at least one daylighting means, wherein each daylighting means comprises:

a) a daylighting panel disposed substantially vertically from the surface of the spanning member cap means; and b) a daylighting panel housing attached to the spanning member cap means, said housing being dimensioned and configured to form a weathertight seal between the raised daylighting panel and the spanning member cap means.

76. A roof module having an integral solar energy concentrating reflector comprising:

a) a roof spanning member having a distal end and a proximal end, each roof spanning member having a plurality of underlying reflector support means, and each roof spanning member being dimensioned and configured to support the weight of all of the roof supported elements in paragraphs b) to d), as well as conventional roof-mounted dead loads and live loads;

b) an attachment means disposed on an end of the roof spanning member, said attachment means being dimensioned and configured to connect to an end of a second roof spanning member in a second module;

c) at least two solar energy concentrating reflectors, at least one reflector being disposed on either side of the roof spanning member each reflector having a concave and cylindrically arcuate configuration of up to 90 degrees, a lower edge, an upper edge, or curved lateral edges, wherein at least one of the edges attaches to at least one underlying panel support point means, the reflectors being disposed such that the skyward surface of each reflector is the concave surface, each reflector having a skyward facing surface that reflects radiant solar energy, the lower edge of each reflector being dimensioned and configured along the lower edge such that the lower edge of a first reflector on a first module can be adjacent to the lower edge of a second arcuately paired reflector on a second module;

d) a spanning member cap means connected to an underlying cap support means, the spanning member cap means extending lengthwise for the length of the roof spanning member and extending laterally across the roof spanning member, wherein the spanning member cap means is dimensioned and configured so as to form a weathertight seal with the underlying reflectors and the roof spanning member; and e) weathertight panel sealing means located at the panel seams.

77. The roof module of claim 76 also comprising:

a) a plurality of reflectors, wherein each reflector is dimensioned and configured along the curved lateral edges wherein the curved lateral edge of a reflector can be placed adjacent along the curved lateral edge of another reflector extending for up to the length of the underlying reflector backing panels so as to form a row of adjacent reflector backing panels; and b) weathertight panel sealing means being located at the panel seams.

78. The roof module of claim 77 having at least one reflector and the underlying reflector backing panel replaced by a daylighting panel, said daylighting panel being dimensioned and configured to form a weathertight seal with adjacent panel seams.

79. The roof module of claim 77 having at least one reflector and the underlying reflector backing panel replaced by a non-reflective roofing panel, said non-reflective roofing panel being dimensioned and configured to form a weathertight seal with adjacent panel seams.

80. The roof module of claim 77 having at least one reflector and the underlying reflector backing panel or at least one non-reflective roofing panel replaced by a daylighting panel, said daylighting panel being dimensioned and configured to form a weathertight seal with adjacent panel seams.

81. The roof module of claim 76 wherein the module has at least one end cap means, each end cap means being connected to otherwise exposed roof elements, and each end cap means being dimensioned and configured so as to form a weathertight seal with the roof elements to which the end cap means is connected.

82. The roof module of claim 76 wherein the roof spanning member comprises a space truss, the space truss having a plurality of web sections, at least one upper chord, and at least two lower chords, one on either side of the upper chord, wherein the upper panel support points are located near the upper chord and the lower panel support points are located near the lower chords.

83. The roof module of claim 76 wherein the reflectors are dimensioned and configured such that each reflector may be detached, removed, and replaced individually.

84. The roof module of claim 76 also comprising:

a) at least one gutter means, each gutter means extending the length of the roof spanning member and being located below and between the lower edge of one of the reflectors, said gutter means being connected to an underlying gutter support means; and b) weathertight gutter sealing means disposed between each gutter means and gutter seams.

85. The roof module of claim 76 wherein the reflectors are comprised of a ultraviolet-stabilized plastic having a reflectorized concave surface.

86. The roof module of claim 76 wherein the weathertight panel sealing means are integrated into the curved lateral edges, the upper edge, and the lower edge of each reflector.

87. The roof module of claim 76 having at least one daylighting means, wherein each daylighting means comprises:

a) a daylighting panel disposed substantially vertically from the surface of the spanning member cap means; and b) a daylighting panel housing attached to the spanning member cap means, said housing being dimensioned and configured to form a weathertight seal between the raised daylighting panel and the spanning member cap means.

* * * * *